No. 738,060. PATENTED SEPT. 1, 1903.
F. PARSONS.
NUT LOCK.
APPLICATION FILED DEC. 4, 1902.
NO MODEL.

Witnesses
Chas. K. Davis.
N. Cleveland.

Inventor
Frank Parsons.
By Alex. J. Wedderburn, Jr.
Attorney

No. 738,060. Patented September 1, 1903.

UNITED STATES PATENT OFFICE.

FRANK PARSONS, OF HOLDREGE, NEBRASKA.

NUT-LOCK.

SPECIFICATION forming part of Letters Patent No. 738,060, dated September 1, 1903.

Application filed December 4, 1902. Serial No. 133,826. (No model.)

*To all whom it may concern:*

Be it known that I, FRANK PARSONS, a citizen of the United States, residing at Holdrege, in the county of Phelps and State of Nebraska, have invented certain new and useful Improvements in Nut-Locks, of which the following is a specification.

My invention relates to certain new and useful improvements in nut-locks for vehicle-axles.

In vehicle-axles it has been found that the mere threading of the axle end in the opposite direction from that in which the tendency of the nut is to turn by its frictional engagement with the wheel-hub is not sufficient to prevent the nut from working off, so means have been devised for locking the nut upon the axle; and my invention relates to improvements in these locks.

It will be observed that my improvements are not only applicable to vehicle-axles, but wherever a nut is to be locked.

To these ends my invention consists in the construction, combination, and arrangement of parts to be hereinafter fully described.

In the accompanying drawings, forming a part of this specification, reference will be had to the several views, in which like numerals of reference denote corresponding parts throughout the several views, in which—

Figure 1:
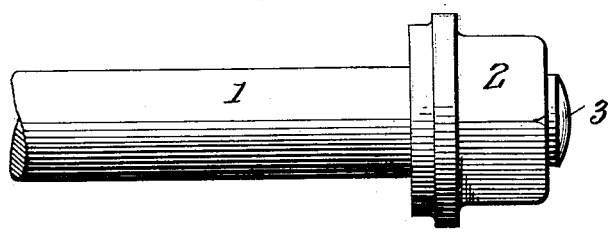
Figure 2:
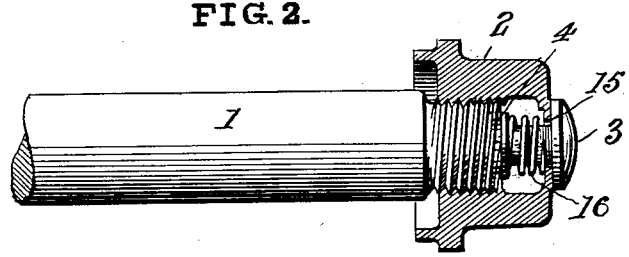
Figure 3:
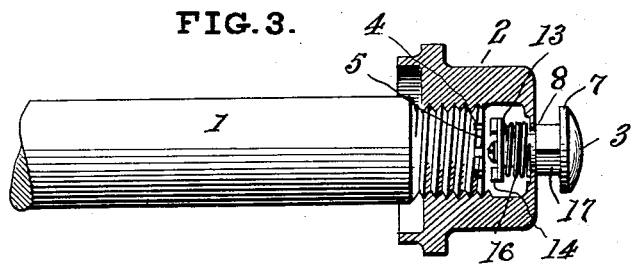
Figure 4:
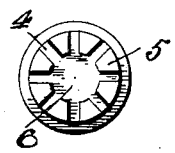
Figure 5:
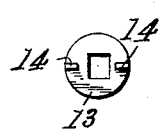
Figure 6:
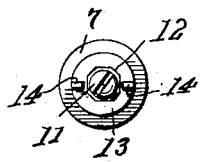
Figure 7:
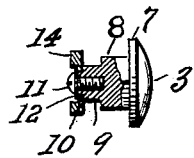

Figure 1 is an elevation of my improvements. Fig. 2 is a similar view showing the nut partly in section and in a locked position. Fig. 3 is a similar view showing the nut out of locked engagement. Fig. 4 is an end view of the axle in elevation. Figs. 5 and 6 are like views of parts of my improved locking member. Fig. 7 is a side elevation of the locking member partly in section.

1 represents an axle or other article to which the nut 2 is to be locked by the locking member 3. The end of the bolt is provided with radial notches 4, lugs 5, and the central cut-away portion 6. The locking member 3 is provided with a head 7, the shank 8 thereof being square in cross-section and having the reduced portions 9 and 10. Upon the reduced portion 10, which is substantially square in cross-section, is secured, by means of the screw 11 and washer 12, a disk 13, upon which is formed integral projections 14, adapted to seat in grooves 4 and engage the lugs 5 of the axle, the cut-away portion 6 receiving the head of the screw 11. The nut 2 is provided in its end with a square aperture 15 to receive the square shank of the locking member, upon which is coiled a spring 16, one end of which engages the inner face of the disk 13 and the other the inner face of the nut.

The operation of my device is as follows: Assume that the nut is locked as seen in Fig. 2 and it is desired to unlock the same. The projections 14 are removed from engagement with the lugs 5 by the withdrawal of the said member 3, which is accomplished through the medium of the head 7. The locking member being withdrawn and being consequently under the tension of the coil-spring 16, which is thereby retracted, it is brought to an inoperated position by its being turned in any suitable manner, so that the corners 17 of the square shank 8 are thrown out of register with the square aperature in the end of the nut, as seen in Fig. 3, when the nut may be easily removed from the axle.

When it is desired to lock the bolt, the shank 8 is turned to register with the square aperture in the nut, at which time the spring in expanding will force the projections 14 again into engagement with the lugs 5 and the head 7 against the outer face of the nut, as seen in Fig. 2.

Having fully described my invention, what I claim to be new and useful, and desire to obtain by Letters Patent, is—

1. The combination with the axle formed with a notched end, of a nut provided in its end with a square opening, a locking member having the greater portion of its shank square in cross-section, and the remaining portion reduced in thickness whereby when the side member is drawn outward and given a partial turn the inner end of the square portion thereof will engage the outer face of said nut, a disk secured to the inner end of said member, said disk being formed with projections to engage the notches of said axle, and a spring interposed between said disk and end of the nut.

2. The combination with the axle having its end formed with notches, of a nut formed with an opening in its end, a locking member operating through the opening of said nut, said locking member comprising a bolt, formed on its outer end with a head, and having its inner portion reduced in thickness thereby forming a shoulder adapted to engage the exterior of the nut when the bolt is drawn outward and given a partial turn, a toothed disk removably secured to the inner end of said locking member, and a spring interposed between said disk and interior of the nut.

In testimony whereof I affix my signature in presence of two witnesses.

FRANK PARSONS.

Witnesses:
R. D. FULLER,
W. H. COWGILL.